United States Patent
Bergman et al.

(10) Patent No.: US 9,009,803 B2
(45) Date of Patent: Apr. 14, 2015

(54) METHOD AND SYSTEM FOR PLANNING AND MANAGEMENT OF DIGITAL EVENTS

(71) Applicant: Capsoole, Inc., Campbell, CA (US)

(72) Inventors: Michael Bergman, Arlington, VA (US); Ayelet Hirshfeld, Campbell, CA (US); Matthew Powers, Cupertino, CA (US)

(73) Assignee: Capsoole, Inc., Campbell, CA (US)

( * ) Notice: Subject to any disclaimer, the term of this patent is extended or adjusted under 35 U.S.C. 154(b) by 134 days.

(21) Appl. No.: 13/861,186

(22) Filed: Apr. 11, 2013

(65) Prior Publication Data
US 2014/0181928 A1    Jun. 26, 2014

Related U.S. Application Data

(60) Provisional application No. 61/848,002, filed on Dec. 20, 2012.

(51) Int. Cl.
G06F 17/30    (2006.01)
H04L 29/06    (2006.01)

(52) U.S. Cl.
CPC ............. *H04L 63/04* (2013.01); *H04L 63/06* (2013.01); *H04L 63/108* (2013.01); *H04L 63/20* (2013.01)

(58) Field of Classification Search
CPC ....... H04L 63/04; H04L 63/06; H04L 63/108; H04L 63/20
USPC ............................................................. 726/6
See application file for complete search history.

(56) References Cited

U.S. PATENT DOCUMENTS

| 6,070,001 | A  | * | 5/2000  | Meissner et al. | 709/203 |
| 2004/0168184 | A1 | * | 8/2004 | Steenkamp et al. | 725/31 |
| 2005/0021467 | A1 | * | 1/2005 | Franzdonk | 705/51 |
| 2011/0072043 | A1 | * | 3/2011 | Wood | 707/769 |
| 2012/0259842 | A1 | * | 10/2012 | Oman et al. | 707/722 |

FOREIGN PATENT DOCUMENTS

WO    2005/119992 A1    12/2005
WO    WO 2005119992 A1 * 12/2005

OTHER PUBLICATIONS

Charles Arthur, "Google Launches Tool to Help Users Plan for Digital Afterlife", The Guardian, Apr. 12, 2013, pp. 1-4.
International Search Report and Written Opinion application No. PCT/US2013/045622 dated Sep. 19, 2013.

* cited by examiner

*Primary Examiner* — Dant Shaifer Harriman
*Assistant Examiner* — Abiy Getachew
(74) *Attorney, Agent, or Firm* — Squire Patton Boggs (US) LLP

(57) ABSTRACT

A method and system is provided that manages events involving an individual's digital assets and/or external services that the individual interfaces with using external service credentials. The method and system allow the individual to securely store digital assets and external service credentials used to login to external services. The method and system further allow the individual to create a plan of actions to be executed on specified dates, where the actions involve one or more of the individual's digital assets and/or involve one or more external services that the individual interfaces with using one or more external service credentials. The plan of actions takes the format of a timeline that includes one or more timeline events, where an action and a date are associated with a timeline event.

25 Claims, 10 Drawing Sheets

METHOD AND SYSTEM FOR PLANNING AND MANAGEMENT OF DIGITAL EVENTS

CROSS REFERENCE TO RELATED APPLICATIONS

This application claims priority under 35 U.S.C. §119(e) of U.S. Provisional Patent Application Ser. No. 61/848,002, filed on Dec. 20, 2012. The subject matter of the earlier filed application is hereby incorporated by reference.

BACKGROUND

1. Field

Some embodiments of the invention relate generally to computer systems and particularly to computer systems that provide services for exchanging digital information, such as email services, social network services, and electronic commerce services.

2. Description of the Related Art

An individual's life is increasing more digital. For example, an individual will likely communicate with friends and family using email services, will create online personas using social network services, will engage in electronic commerce transactions using electronic commerce services, and engage in other digital services. In order to utilize such digital services, a user must provide information to various digital service providers, such as a name, email address, physical address, password, and credit card number. In addition, the user may provide other types of information, such as documents, images, and other electronic files, to the digital service providers, with the purpose of sharing the information with other individuals, using one or more digital services. The amount of information provided to digital service providers can be vast, due to the number of digital service providers that an individual can interact with, and due to the amount of the information a user may be required (or may desire) to provide to each digital service provider. Management of this vast amount of information can be extremely challenging to an individual, as there is generally no central mechanism for managing such a large amount of information. Further, such information is generally retained by the digital service providers, and can be vulnerable to mining and exploitation.

The difficulty of managing such information can be further increased when the individual dies, or is otherwise incapacitated. This is because the individual is generally reluctant to share this information with, or provide access to the information to, other individuals, due to a fear that the information will be compromised. Further, an individual is generally reluctant to envision a scenario where he/she is dead and incapacitated due to the discomfort associated with envisioning such a scenario. Thus, the individual is unlikely to provide instructions to friends and family on how to manage the information provided to the digital service providers in light of the individual's death or incapacitation. The lack of access and/or instructions can significantly increase the difficulty of managing the information in the event of the individual's death or incapacitation, as it is generally difficult or impossible for the individual's friends or family members to recover such information from the various service providers without the explicit authorization of the individual.

SUMMARY

According to an embodiment of the invention, a method includes creating a user account for a digital event management server, where the user account includes one or more attributes of a user of the digital event management server. The method further includes creating one or more external service credentials that are associated with the user account, where an external service credential includes one or more parameters used to connect to an external service. The method further includes creating one or more timeline events that collectively form a timeline that is associated with the user account, where a timeline event includes an action to be executed by a timeline server and a date the action is to be executed (such as a relative date or an absolute date), and where the timeline includes the one or more timeline events.

According to another embodiment, an apparatus includes a processor configured to execute one or more modules. The apparatus further includes a memory configured to store one or more modules. The apparatus further includes a user account creation module configured to create a user account for a digital event management server, where the user account includes one or more attributes of a user of the digital event management server. The apparatus further includes an external service credential creation module configured to create one or more external service credentials that are associated with the user account, where an external service credential includes one or more parameters used to connect to an external service. The apparatus further includes a timeline event creation module configured to create one or more timeline events that collectively form a timeline that is associated with the user account, where a timeline event includes an action to be executed by a timeline server and a date the action is to be executed (such as a relative date or an absolute date), and wherein the timeline includes the one or more timeline events.

According to another embodiment, a non-transitory computer-readable medium, including a computer program embodied therein, is configured to control a processor to implement a method. The method includes creating a user account for a digital event management server, where the user account includes one or more attributes of a user of the digital event management server. The method further includes creating one or more external service credentials that are associated with the user account, where an external service credential includes one or more parameters used to connect to an external service. The method further includes creating one or more timeline events that collectively form a timeline that is associated with the user account, where a timeline event includes an action to be executed by a timeline server and a date the action is to be executed (such as a relative date or an absolute date), and where the timeline includes the one or more timeline events.

According to another embodiment, an apparatus includes means for creating a user account for a digital event management server, where the user account includes one or more attributes of a user of the digital event management server. The apparatus further includes means for creating one or more external service credentials that are associated with the user account, where an external service credential includes one or more parameters used to connect to an external service. The apparatus further includes means for creating one or more timeline events that collectively form a timeline that is associated with the user account, where a timeline event includes an action to be executed by a timeline server and a date the action is to be executed (such as a relative date or an absolute date), and where the timeline includes the one or more timeline events.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein.

DETAILED DESCRIPTION

Figure 1:
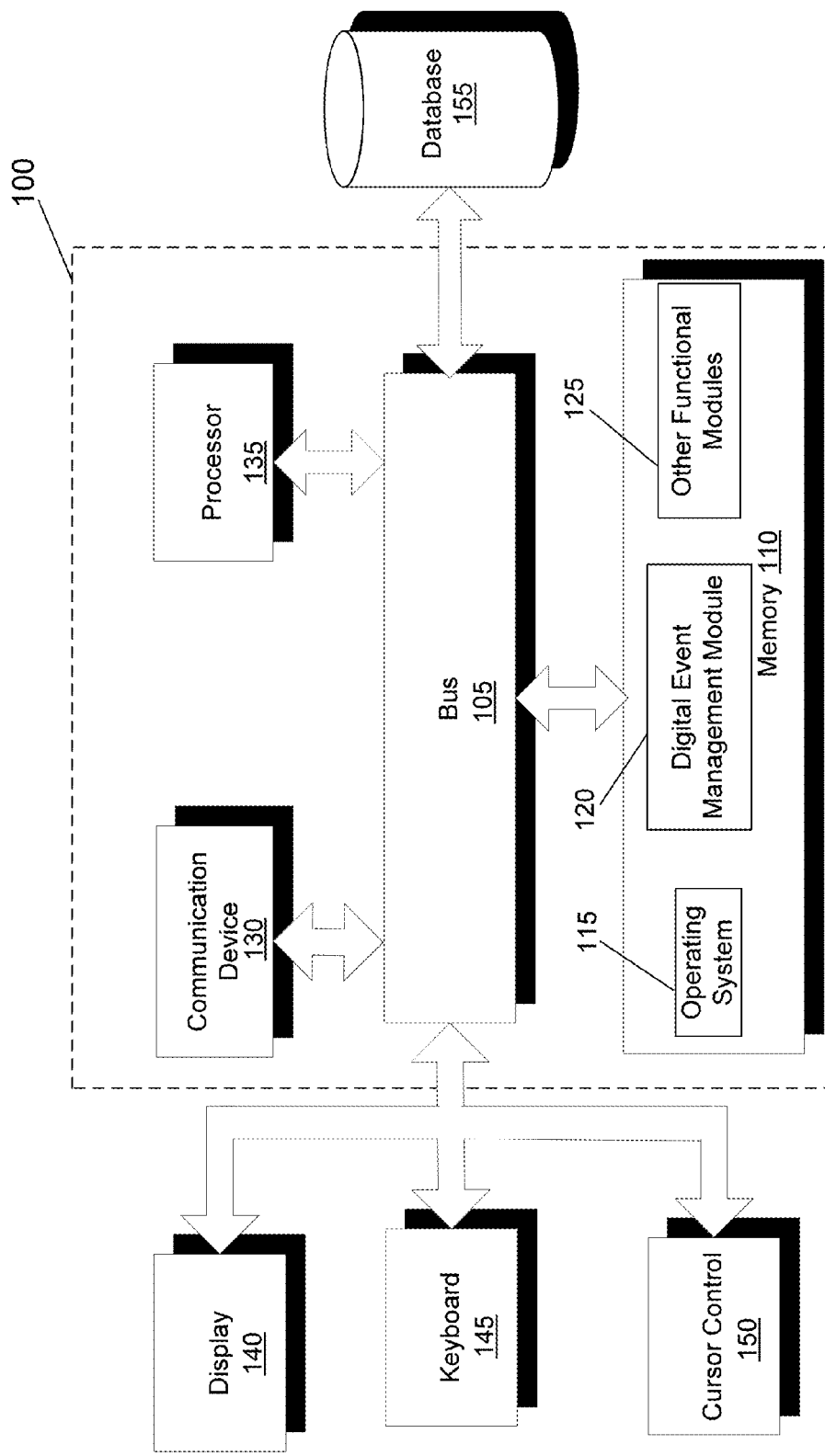
FIG. 1 illustrates a block diagram of an apparatus, according to an embodiment of the invention.

It will be readily understood that the components of the present invention, as generally described and illustrated in the figures herein, may be arranged and designed in a wide variety of different configurations. Thus, the following detailed description of the embodiments of a method, apparatus, system, and computer-readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

A "computer" or "device" as understood by one of ordinary skill in the art, is any programmable machine that receives input, automatically stores and manipulates data, and provides output. A "computer program" is any sequence of instructions written to perform a specific task on a computer, and has an executable form that a computer (typically through the use of a processor) can use to execute the instructions. A "computer module," "software module," or "module" is any computer program, or a portion thereof, that encapsulates related functions. A "computer application," "software application," or "application" is any collection of computer programs and/or modules. A "computer network" or "network" is any collection of computers interconnected by communication channels that facilitate communication among the computers.

In addition, a "service" or "web service," as understood by one of ordinary skill in the art, is a module or application designed to support interoperable computer-to-computer interaction over a network. A service can have an interface described in a computer-processable format. A computer can interact with a service by sending messages over a network protocol. Examples of services are Big Web services and RESTful services. Big Web services are services that follow a Simple Object Access Protocol (SOAP) standard and use Extensible Markup Language (XML) messages. RESTful services are services that utilize a Representational State Transfer (REST) style of software architecture, where clients are separate from servers by a uniform interface.

Furthermore, a "server" is an example of a computer that includes a computer program or module whose instructions serve requests of other computer programs, such as performing computation tasks on behalf of other computer programs. The term "server" can alternatively refer to the computer program or module that is executed on the computer. A "client" is an example of a computer that includes a computer program or module whose instructions access one or more services made available by a server. The term "client" can also alternatively refer to the computer program or module that is executed on the computer.

According to an embodiment, a method and system is provided that can manage events involving an individual's digital assets and/or external services that the individual interfaces with using external service credentials. Examples of such external services can include email services, social network services, and electronic commerce services. The method and system can further manage such events throughout the life of the individual, and even after the death (or an incapacitation) of the individual. For example, the individual can manage events such as sharing a picture or note with friends and family, changing security settings associated with the individual's social network services (in order to protect data), configuring forwarding settings associated with the individual's email services, deleting contacts from the individual's email services and social network services, deleting archived email messages, and initiating a shutdown of any automatic payments, and/or a deletion of credit cards, associated with the individual's electronic commerce services.

According to the embodiment, the method and system can allow the individual to securely store digital assets and external service credentials used to login to external services. The method and system can further allow the individual to create a plan of actions to be executed on specified relative dates or specified absolute dates, where the actions can involve one or more of the individual's digital assets and/or can involve one or more external services that the individual interfaces with using one or more external service credentials. The plan of actions can take the format of a timeline that includes one or more timeline events, where an action and a date can be associated with a timeline event, where the date is either a relative date or an absolute date. In accordance with the embodiment, the timeline can be activated and executed in response to a trigger, where the trigger can represent a significant occurrence (such as the death or incapacitation of the individual). Alternatively, the timeline can be activated and executed upon a specified date without the requirement of a trigger.

When the timeline is activated and executed, each timeline event can be translated into executable instructions (or actions), where the executable instructions (or actions) can be executed within external services. Further, the method and system can allow for secondary authentications before the timeline is activated and executed, and can also provide an override mechanism so that the individual can override the activation and execution of the timeline. In certain embodiments, the system can be a web-based system, and can allow an individual to manage digital assets residing on other systems and other electronic devices.

FIG. 1 illustrates a block diagram of an apparatus 100, according to an embodiment of the invention. Apparatus 100 includes a bus 105 or other communications mechanism for communicating information between components of apparatus 100. Apparatus 100 also includes a processor 135, operatively coupled to bus 105, for processing information and executing instructions or operations. Processor 135 may be any type of general or specific purpose processor. Apparatus 100 further includes a memory 110 for storing information and instructions to be executed by processor 135. Memory 110 can be comprised of any combination of random access memory (RAM), read only memory (ROM), static storage such as a magnetic or optical disk, or any other type of machine or computer-readable medium. Apparatus 100 further includes a communication device 130, such as a network interface card or other communications interface, to provide access to a network. As a result, a user may interface with apparatus 100 directly, or remotely through a network or any other method. In addition, apparatus 100 may interface with any resources through a network using communication device 130.

A computer-readable medium may be any available medium that can be accessed by processor 135. A computer-readable medium may include both a volatile and nonvolatile medium, a removable and non-removable medium, and a storage medium. A storage medium may include RAM, flash memory, ROM, erasable programmable read-only memory (EPROM), electrically erasable programmable read-only memory (EEPROM), registers, hard disk, a removable disk, a compact disc read-only memory (CD-ROM), or any other form of storage medium known in the art.

Processor 135 can also be operatively coupled via bus 105 to a display 140, such as a Liquid Crystal Display (LCD). Display 140 can display information to the user. A keyboard 145 and a cursor control device 150, such as a computer mouse, can also be operatively coupled to bus 105 to enable the user to interface with apparatus 100.

According to one embodiment, memory 110 can store software modules that may provide functionality when executed by processor 135. The modules can include an operating system 115, a digital event management module 120, as well as other functional modules 125. Operating system 115 can provide an operating system functionality for apparatus 100. Digital event management module 120 can provide functionality for managing events involving a user's digital assets and/or external services that the user interfaces with using external service credentials. In certain embodiments, digital event management module 120 can comprise a plurality of modules that each provide specific individual functionality for managing events involving a user's digital assets and/or external services that the user interfaces with using external service credentials. Apparatus 100 can also be part of a larger system. Thus, apparatus 100 can include one or more additional functional modules 125 to include the additional functionality.

Processor 135 can also be operatively coupled via bus 105 to a database 155. Database 155 can store data in an integrated collection of logically-related records or files. Database 155 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
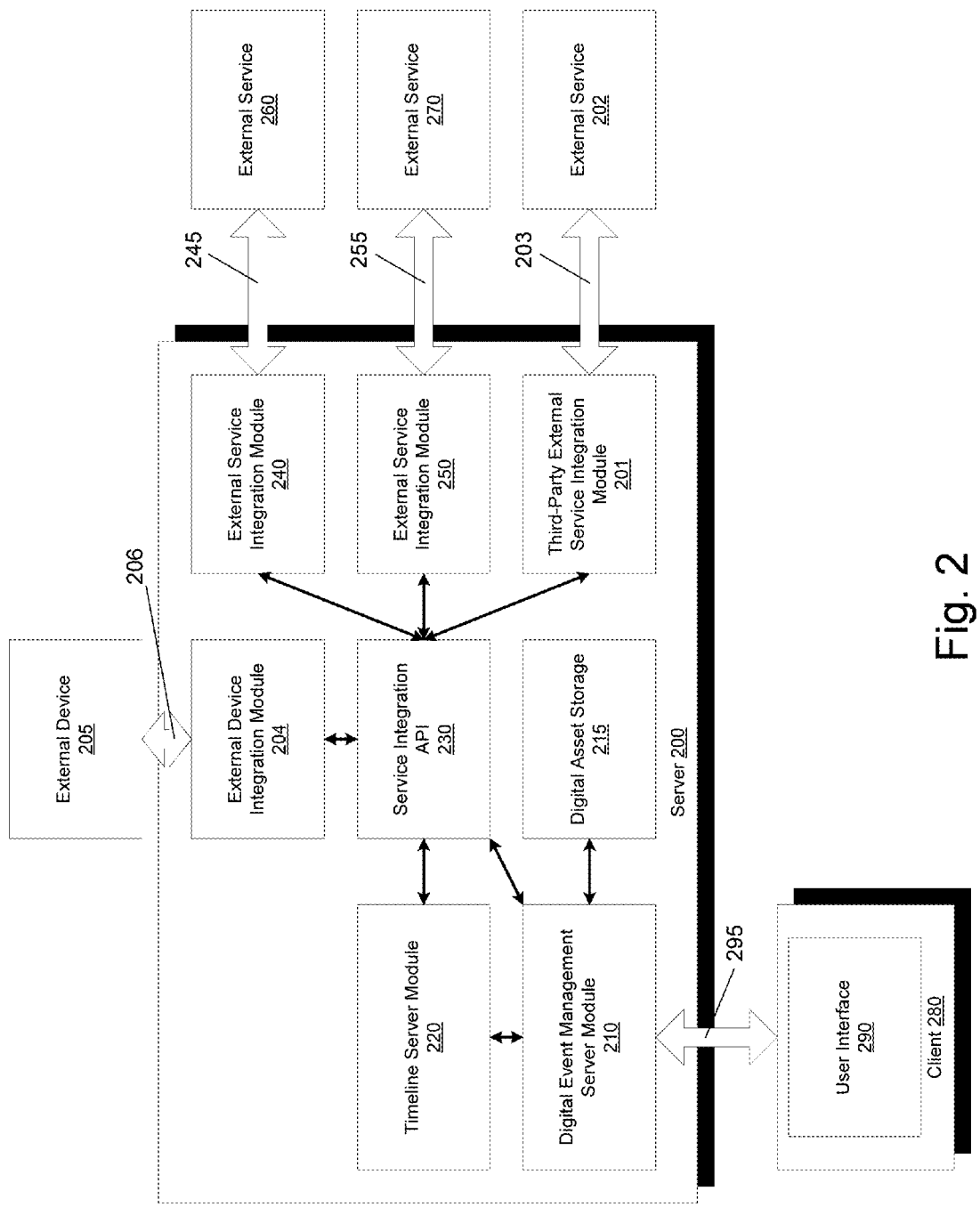
FIG. 2 illustrates a diagram of a system, according to an embodiment of the invention.

FIG. 2 illustrates a diagram of a system, according to an embodiment of the invention. The components of the system illustrated in FIG. 2 can each be located on a separate computer or device, or can all be located on the same computer or device. Further, the system can include other components not illustrated in FIG. 2. Even further, in alternate embodiments, the system can only include some of the components illustrated in FIG. 2, where the other components are not included as part of the system in those embodiments.

According to the embodiment, the system includes server 200. Server 200 is a computer that includes one or more modules that can collectively manage events involving a user's digital assets and/or external services that the user interfaces with using external service credentials. Server 200 can be any type of computer known in the art, such as a microcomputer, a personal computer, a desktop computer, a laptop computer, a notebook computer, a minicomputer, a mainframe computer, a supercomputer, or a workstation.

According to the embodiment, the system further includes a digital event management server module 210, which can be executed on server 200. Digital event management server module 210 is a module that can include one or more computer programs that can provide functionality and model data entities used to provide the functionality. More specifically, digital event management server module 210 can provide functionality for managing events involving a user's digital assets and/or external services that the user interfaces with using external service credentials. In certain embodiments, the one or more computer programs of digital event management server module 210 can be created using the Java® programming language.

According to the embodiment, the following functionality is example functionality provided by digital event management server module 210. For example, digital event management server module 210 can create one or more user accounts. A user account is a representation of a user of the system. By creating a user account, digital event management server module 210 allows a user to access the functionality provided by digital event management server module 210. A user account includes one or more attributes of the user. Example attributes can include a first name, a last name, an email address, and a password. A user can use a user interface (such as user interface 290, which is described below in greater detail) to provide digital event management server module 210 with the one or more attributes. An example user interface for creating a user account is further described below in greater detail in relation to FIG. 6.

Digital event management server module 210 can further create one or more external service credentials that are associated with a user account. An external service credential is a set of one or more parameters used to connect to an external service (such as external services 260 and 270, which are described below in greater detail). More specifically, the set of one or more parameters can be passed to an external service within a request to connect to the external service, and the external service can validate the parameters, and can send a response granting the request to connect to the external service. Example parameters can include a login and a password. A user can use a user interface (such as user interface 290, which is described below in greater detail) to provide digital event management server module 210 with the one or more parameters. An example user interface for creating an external service credential is further described below in greater detail in relation to FIG. 7.

As another example, digital event management server module 210 can create one or more trustees that are associated with a user account. A trustee is a representation of a trusted user who is affiliated with the user of the user account. A trustee can provide an activation code to digital event management server module 210, where the activation code verifies a trigger that is associated with a timeline of one or more timeline events, where the trigger is used to activate and execute the timeline. Examples of a trigger can include the death or incapacitation of the user of the user account. A trustee includes one or more attributes of the trustee. Example attributes can include a first name, a last name, an email address, or an activation code. A trustee further includes one or more questions and answers that can be used to verify the trustee, when the trustee provides the activation code to digital event management server module 210. More specifically, when the trustee logs in, digital event management server module 210 can present the trustee with one or more of the questions. The trustee can provide the one or more answers for the one or more questions. If the one or more answers provided by the trustee match the stored one or more answers associated with the trustee, digital event management server module 210 can accept the activation code provided by the trustee. A user can use a user interface (such as user interface 290, which is described below in greater detail) to provide digital event management server module 210 with the one or more attributes. An example user interface for creating a trustee is further described below in greater detail in relation to FIG. 8.

Digital event management server module 210 can further receive an activation code from one or more trustees, where the provision of the activation code from the one or more trustees can represent a trigger associated with a timeline of one or more timeline events. Examples of a trigger can include the death or incapacitation of the user of the user account. Digital event management server module 210 can further provide a set of questions associated with each trustee of the one or more trustees, and can verify that a set of answers provided by each trustee matches a stored set of answers associated with each trustee. Thus, digital event management server module 210 can verify an identity of the one or more trustees.

As another example, digital event management server module 210 can further define an activation threshold, where the activation threshold is a number of activation codes required to be received from trustees in order to activate and execute a timeline. This can provide flexibility to a user of the user account, in allowing the user to define how many trustees are required to verify that a trigger has occurred, before a timeline is activated and executed. A user can use a user interface (such as user interface 290, which is described below in greater detail) to define an activation threshold. An example user interface for defining an activation threshold is further described below in greater detail in relation to FIG. 8.

As another example, digital event management server module 210 can further store one or more digital assets in a secure storage (such as digital asset storage 215, which is described below in greater detail), where the one or more digital assets are associated with a user account. A digital asset is any digital information, such as an item of text or media (e.g., a document, an image, or a video) stored within a digital format (e.g., a computer file). A digital asset can include one or more attributes that are associated with the text/media item stored within the digital format. An example of an attribute is an item of text that serves as a note that is associated with the digital asset. A user can use a user interface (such as user interface 290, which is described below in greater detail) to upload the one or more digital assets to digital event management server module 210. An example user interface for storing a digital asset is further described below in greater detail in relation to FIG. 9.

As another example, digital event management server module 210 can further create one or more timeline events that collectively form a timeline that is associated with a user account, where a timeline is a collection of one or more timeline events. A timeline event is an action to be executed by timeline server module (such as timeline server module 220, which is described below in greater detail). In certain embodiments, the action can be executed at an external service using an external service integration module (such as external service integration modules 240 and 250, which are described below in greater detail) and an external service credential. In some of these embodiments, the action can include performing a function within the external service using the integration module and the external service credential. In other embodiments, the action can be an action performed on one or more digital assets, but where the action is executed at server 200 rather than at an external service. An example action includes publishing a digital asset within a user interface (such as user interface 290, which is described below in greater detail). In other embodiments, the action can be executed at an external service using a third-party external service integration module (such as third-party external service integration module 201, which is described below in greater detail). In yet other embodiments, the action can be executed at an external device using an external device integration module (such as external device integration module 204, which is described below in greater detail). In other embodiments, the action can both be executed at an external service (or an external device) and can be performed on one or more digital assets. A timeline event also includes a date that the action is to be executed on. The date can be an absolute date or a relative date. An absolute date is a calendar date. A relative date is a date that is a specified time period subsequent to an activation of the timeline that the timeline event is part of. A timeline event can also include one or more attributes. Example attributes include an external service, an event type, one or more recipients, a subject, a message, an attachment, a repetition indicator that indicates whether the event is executed once or repeatedly performed, and a relative date indicator that indicates a time period subsequent to an activation of the timeline that the event is to be executed. A user can use a user interface (such as user interface 290, which is described below in greater detail) to provide digital event management server module 210 with the one or more attributes. An example user interface for creating a timeline event is further described below in greater detail in relation to FIG. 10.

Digital event management server module 210 can further validate one or more trustees. Digital event management server module 210 can validate a trustee by receiving an activation code provided by the trustee and validating the activation code. Digital event management server module 210 can further present the trustee with one or more of the questions. The trustee can provide the one or more answers for the one or more questions. If the one or more answers provided by the trustee match the stored one or more answers associated with the trustee, digital event management server module 210 can accept the activation code provided by the trustee. A user can use a user interface (such as user interface 290, which is described below in greater detail) to provide digital event management server module 210 with an activation code, and to provide digital event management server module 210 with one or more answers for one or more questions.

Digital event management server module 210 can further model one or more data entities that can be utilized to manage events involving a user's digital assets and/or external services that the user interfaces with using external service credentials. In an embodiment where the one or more programs of digital event management server module 210 are created using a Java® programming language, the entities can be modeled solely using Java® code with no external dependencies. According to the embodiment, the following data entities are example data entities that can be modeled by digital event management server module 210.

Digital event management server module 210 can model a "User" entity that represents a user account. In certain embodiments, the User entity can be a primary class of the system. In an embodiment where the one or more programs of digital event management server module 210 are created using a Java® programming language, the User entity can be an instance of a User.java class. The User entity can manage one or more trustees, one or more digital assets, one or more external service credentials, and one or more timeline events. Starting at an instance of the User entity, an entire object graph of data associated with a user of the system can be reached and can be self-contained.

Digital event management server module 210 can further model a "Trustee" entity that represents a trustee. In an embodiment where the one or more programs of digital event management server module 210 are created using a Java® programming language, the Trustee entity can be an instance of a Trustee.java class. Further, digital event management server module 210 can further model an "Event" entity that represents a timeline event. In an embodiment where the one or more programs of digital event management server module 210 are created using a Java® programming language, the Event entity can be an instance of an Event.java class. Additionally, digital event management server module 210 can further model a "Service Credential" entity that represents an external service credential. In an embodiment where the one or more programs of digital event management server module 210 are created using a Java® programming language, the Service Credential entity can be an instance of ServiceCredential.java class.

Further, digital event management server module 210 can model an "Asset" entity that represents a digital asset. In an embodiment where the one or more programs of digital event management server module 210 are created using a Java® programming language, the Asset entity can be an instance of an Asset.java class. Event further, digital event management server module 210 can model an "Integration" entity that represents an integration of an external service. In an embodiment where the one or more programs of digital event management server module 210 are created using a Java® programming language, the Integration entity can be an instance of an Integration.java class. Also, digital event management server module 210 can model an "Auth" entity that represents a user authentication and storage service. In an embodiment where the one or more programs of digital event management server module 210 are created using a Java® programming language, the Auth entity can be an instance of an Auth.java class.

The system further includes a digital asset storage 215. Digital asset storage 215 is a secure storage configured to store one or more digital assets. Digital event management server module 210 can securely store and retrieve one or more digital assets from digital asset storage 215. The one or more digital assets can be securely stored within, and retrieved from, digital asset storage 215 using any storage mechanism that is known in the relevant art. Such a storage mechanism can include a key-value storage mechanism.

The system further includes a timeline server module 220, which can be executed on server 200. Timeline server module 220 is a module that can receive a timeline from digital event management server module 210, where the timeline has been activated by digital event management server module 210. More specifically, digital event management server module 210 can receive an activation code from a trustee. Digital event management server module 210 can further receives one or more answers to one or more questions. Digital event management server module 210 can further send a notification to the user notifying him of the activation. This provides the user an opportunity to override the activation. Digital event management server module 210 can further send one or more notifications to one or more additional trustees. Digital event management server module 210 can further request that the one or more additional trustees provide an activation code. Once an activation threshold has been met (i.e., once a sufficient number of trustees have provided an activation code), digital event management server module 210 can further send the timeline to timeline server module 220 for execution. Timeline server module 220 can optionally wait a pre-defined time period (such as twenty-four hours) before executing the timeline.

Timeline server module 220 can further execute the timeline by executing the one or more timeline events of the timeline. More specifically, timeline server module 220 can schedule each timeline event of the one or more timelines on a date that is associated with the corresponding timeline event. Further, on the date, timeline server module 220 can execute an action associated with the timeline event, where an action includes one or more executable instructions. In embodiments where the action involves an external service (such as external services 260 and 270, which are described below in greater detail), timeline server module 220 can send the timeline event to an external service integration module (such as external service integration modules 240 and 250, which are described below in greater detail). Timeline server module 220 can further execute the timeline event at the external service using the external service integration module and an external service credential, where the external service credential is used to connect to the external service. Further, in other embodiments where the action involves an external service (such as external service 202, which is described below in greater detail), timeline server module 220 can send the timeline event to a third-party external service integration module (such as third-party external service integration module 201, which is described below in greater detail). Timeline server module 220 can further execute the timeline event at the external service using the third-party external service integration module and an external service credential, where the external service credential is used to connect to the external service. In other embodiments, where the action involves an external device (such as external device 205, which is described below in greater detail), timeline server module 220 can send the timeline event to an external device integration module (such as external device integration module 204, which is described below in greater detail). Timeline server module 220 can further execute the timeline event at the external device using the external device integration module. Further, in other embodiments, timeline server module 220 can execute the timeline event at server 200. In certain embodiments, upon receiving a notification to cancel an activation of a timeline, timeline service module 220 can stop any timeline events that are currently executing, and cancel any timeline events that are currently pending, but have not yet been executed.

The system further includes a service integration application programming interface (API) 230, which can be stored on server 200. Service integration API is an API that can be used by timeline server module to send one or more timeline events to one or more external service integration modules (such as external service integration modules 240 and 250, which are described below in greater detail), one or more third-party external service integration modules (such as third-party external service integration module 201, which is described below in greater detail), or one or more external device integration modules (such as external device integration module 204, which is described below in greater detail). More specifically, service integration API 230 can provide one or more function definitions, where an external service integration module, a third-party external service integration module, or an external device integration module, can provide one or more function implementations for at least one function definition of the one or more function definitions. Thus, service integration API 230 can be understood as an integration of the one or more external service integration modules, third-party external service integration modules, and/or external device integration modules. In certain embodiments, service integration API 230 can include a service package and a descriptor package. The service package provides base classes for the external service integration modules, third-party external service integration modules, and/or external device integration modules to implement. The descriptor package provides entities for the external service integration modules, third-party external service integration modules, and/or external device integration modules to describe themselves to the system with. An aim of the descriptor package is to facilitate generic user interface implementations which do not require any modifications where new external service integration modules, third-party external service integration modules, and/or external device integration modules are added to the system.

In certain embodiments, service integration API 230 can provide a metadata layer for use in generating one or more user interface elements. More specifically, the metadata layer can be used by a user interface (such as user interface 290, which is described below in greater detail) to generate user interface components, and can be used by digital event management server module 210 to facilitate interaction between the user and an external service integration module, a third party external service integration module, and/or an external device integration module at the time the user is creating one or more timeline events.

According to an embodiment, each external service has a name and description. The name can be used by the user interface to determine the location of one or more digital assets stored on a server that provides the external service. Further, each external service has a set of one or more events, where each event includes a name and description. This information can be used by the user interface to present the one or more events the external service provides, and describe to the user what the one or more events do. Further, each event can optionally include one or more parameters, where each parameter can include a name and description. A parameter can also include additional metadata, such as a data type of the parameter. The user interface can use this information to generate user interface components. For example if the data type of a parameter is declared as a Boolean data type, then the user interface can represent that parameter as a checkbox.

Further, a parameter may be declared such that it requests an endpoint for the user interface to communicate with the external service integration module. For example a parameter may have a data type of "List." In this case, the parameter can indicate to the user interface that the value for the parameter can be selected from a list of options, which are provided by the external service integration module via an endpoint.

The system further includes external service integration modules 240 and 250, which can be executed on server 200. External service integration modules 240 and 250 are each a module that can include one or more computer programs that can facilitate communication between timeline server module 220 and an external service (such as external services 260 and 270, which are described below in greater detail). Thus, external service integration modules 240 and 250 allow the system to connect to one or more external services. More specifically, external service integration modules 240 and 250 can each receive a timeline event from timeline server module 220, and can execute an action of the timeline event at an external service (such as external services 260 and 270), where an action can include one or more executable instructions. By executing an action at an external service, external service integration modules 240 and 250 can each perform one or more functions within the external service. External service integration modules 240 and 250 can make use of one or more published integration methods where appropriate, and can impersonate client side hypertext transfer protocol (HTTP) communications where no published integration methods are available. According to the embodiment, each external service integration module can be associated with an external service. Thus, in the illustrated embodiment, external service integration module 240 can be associated with external service 260, and external service integration module 250 can be associated with external service 270. Further, in the illustrated embodiment, external service integration module 240 can connect to external service 260 using an HTTP communication protocol 245, and external service integration module 250 can connect to external service 270 using an HTTP communication protocol 255. Further, external service integration module 240 can use an external service credential to connect to external service 260, and external service integration module 250 can use a separate external service credential to connect to external service 270. In certain embodiments, the one or more computer programs of external service integration modules 240 and 250 can be created using the Java® programming language. One of ordinary skill in the art would readily appreciate that, in alternate embodiments, the system can include any number of external service integration modules.

In certain embodiments, external service integration module 240 can facilitate communication between timeline server module 220 and an external service (such as external service 260) that is an external social network service. In these embodiments, external service integration module 240 can use one or more HTTP client impersonation methods to provide one or more functions that can be executed within the external social network service. Example functions include: (1) List Friends; (2) Post Status; (3) Post Status with Image; (4) Upload Image; (5) Set Profile Picture; (6) Send Message to Friend(s); (7) Delete All Messages; (8) Delete Messages from User; (9) List all Messages; (10) Set Account as Memorial; (11) Delete Account; (12) Delete all Friends; (13) Request Archive; and (14) Get Archive.

In certain embodiments, external service integration module 250 can facilitate communication between timeline server module 220 and an external service (such as external service 270) that is an external email service. In these embodiments, external service integration module 250 can make use of a simple mail transfer protocol (SMTP) and/or an internet message access protocol (IMAP) to communicate with the external email service, for the purpose of sending and receiving email messages, inspecting/downloading contents of various email folders, and deleting email messages. External service integration module 260 can further use a client library for accessing and editing one or more contacts of a user's email account. In these embodiments, external service integration module 260 can further use one or more HTTP client impersonation methods to provide one or more functions that can be executed within the external email service. Example functions include: (1) Get Contacts; (2) Send Email; (3) Get All Messages; (4) Get Messages Between; (5) Delete All Messages; (6) Delete Messages Between; (7) Delete Contact; (8) Delete All Contacts; (9) Create Archive; (10) Download Archive; and (11) Delete Account.

In embodiments where the one or more computer programs of external service integration modules 240 and 250 can be created using the Java® programming language, external service integration modules 240 and 250 an each include one or more of the following Java® packages: (1) com.capsoole.store—an embeddable key-value store used to store cookies and for caching by HTTP client code; (2) com.capsoole.webclient—an API that performs HTTP client communications and parses hypertext markup language (HTML) data and JavaScript Object Notation (JSON) data; or (3) com.capsoole.services.ServiceBase—a base class for authenticated HTTP client sessions. In certain embodiments, external service integration modules 240 and 250 can each include one or more third-party Java® libraries. Such third-party Java® libraries can include: (1) Apache HTTP-Client; (2) JSON; (3) Google Gdata; (4) HTML parser; or (5) Java Mail.

According to the embodiment, the system further includes external services 260 and 270. External services 260 and 270 are examples of an external service that the system can connect to, where an external service is any service that is external to the system. An external service can be executed on any type of device, such as an electronic device, a mobile device, a desktop computer, a laptop computer, a tablet computer, or a smartphone. An example of an external service is an external email service, such as the Gmail™ email service provided by Google®, the Yahoo! Mail™ email service provided by Yahoo®, the Outlook.com™ email service provided by Microsoft®, or the AOL Mail™ email service provided by AOL®. Another example of an external service is an external social network service, such as the Facebook™ social network service provided by Facebook™, the LinkedIn™ social network service provided by LinkedIn™, the Google+™ social network service provided by Google®, and the Twitter™ social network service provided by Twitter™. Another example of an external service is an external electronic commerce service, such as the eBay® electronic commerce service provided by eBay®, the PayPal™ electronic commerce service provided by PayPal™, and the Amazon.com® electronic commerce service provided by Amazon®. One of ordinary skill in the art would readily appreciate that, in alternate embodiments, the system can connect to any number of external services.

The system further includes third-party external service integration module 201. Third-party external service integration module 201 provides similar functionality as external service integration modules 240 and 250, but is provided by an external service provider of the external service. One of ordinary skill in the art would readily appreciate that, in alternate embodiments, the system can include any number of third-party external service integration modules. According to the embodiment, the system further includes external service 202. External service 202 is an example of an external service that the system can connect to, where an external service provider of the external service has also provided a third-party external service integration module (such as third-party external service integration module 201). Further, in the illustrated embodiment, third-party external service integration module 201 can connect to external service 202 using an HTTP communication protocol 203.

The system further includes external device integration module 204. External device integration module 204 is a module that can include one or more computer programs that can facilitate communication between timeline server module 220 and an external device (such as external device 205, which is described below in greater detail). Thus, external device integration module 204 allows the system to connect to one or more external devices. More specifically, external device integration module 204 can receive a timeline event from timeline server module 220, and can execute an action of the timeline event at a software application (or other software component) of an external device (such as external device 205), where an action can include one or more executable instructions. By executing a software application (or other software component) of an external device, external device integration module 204 can perform one or more functions within the software application (or other software component) of the external device. An example of such a function includes deleting one or more contacts from the device. One of ordinary skill in the art would readily appreciate that, in alternate embodiments, the system can include any number of external device integration modules. According to the embodiment, the system further includes external device 205. External device 205 can be any type of device, such as an electronic device, a mobile device, a desktop computer, a laptop computer, a tablet computer, or a smartphone. Further, in the illustrated embodiment, external device integration module 204 can connect to a software application (or other software component) of external device 205 using an HTTP communication protocol 206.

In accordance with the embodiment, the system further includes client 280. Client 280 is a computer that includes one or more modules that that can collectively access one or more services on a remote server, such as server 200. Client 280 can be any kind of a computer, such as a laptop computer, a notebook computer, a Palmtop computer, a tablet computer, a smartphone, a smartbook, a personal digital assistant (PDA), a minicomputer, or an embedded computer. The system further includes user interface 290, which can be executed on client 280. User interface 290 is a component of the system that includes one or more computer programs that collectively allow a user of the system to interact with digital event management server module 210. More specifically, user interface 290 provides a graphical user interface that allows a user of the system to enter information. User interface 290 subsequently transmits information to digital event management server module 210. User interface 290 can further receive information from digital event management server module 210 and display the information within the graphical user interface. User interface 290 provides the following example functionality: (1) allows a user to create one or more user accounts; (2) allows a user to create one or more external service credentials; (3) allows a user to create one or more trustees; (4) allows a user to store one or more digital assets; (5) allows a user to create one or more timeline events; (6) allows a user to provide an activate code to activate a timeline; and (7) allows a user to send a notification to cancel an activation of a timeline.

In certain embodiments, the one or more computer programs of user interface 290 can be created using one or more of the following languages: (1) HTML; (2) cascading style sheets (CSS); or (3) JavaScript. In some of these embodiments, the one or more computer programs of user interface 290 can be implemented using JQuery and/or JQuery user interface toolkits. The one or more computer programs of user interface 290 can make use of a JavaScript Asynchronous JavaScript and Extensible Markup Language (AJAX) library to call one or more functions of one or more REST endpoints. In these embodiments, digital event management server module 210 can include a JavaScript AJAX library as well. Further, in some of these embodiments, user interface 290 can communicate with digital event management server module 210 using a REST API 295. REST API 295 is a REST-style HTTP API that can expose functionality provided by digital event management server module 210 to user interface 290 (or to any other user interface). In certain embodiments, REST API 295 can utilize a Java® programming language API entitled "Java API for RESTful Web Services" (JAX-RS). REST API 295 can utilize JAX-RS via Apache Jersey, which is an open source reference implementation of the JAX-RS specification that is executed in a version of Apache Tomcat. Information can be transferred via REST API 295 using JSON bindings for Java Architecture for XML Binding (JAXB). According to some of the embodiments, REST API 295 can deviate from a pure REST style by not relying on HTTP error codes for communicating error conditions to user interface 290. Instead, REST calls that result in an error condition within digital event management server module 210 can rely on JSON message returned to user interface 290 to communicate error conditions. In certain embodiments, REST API 295 can be found in an API class and in a com.capsoole.rest package stored on server 200. The com.capsoole.rest package can provide wrapper classes for serializing core classes into a JSON format.

In certain embodiments, the following is an example list of REST endpoints included within REST API 295:

```
/rest/api/authorize POST
/rest/api/details GET PUT POST DELETE
/rest/api/details/activationThreshold PUT
/rest/api/trustees POST GET
/rest/api/trustees/{activationCode} DELETE
/rest/api/trustees/{activationCode}/questions GET POST
/rest/api/trustees /{activationCode}/questions/{question} DELETE
/rest/api/trustees /credentials GET POST PUT
/rest/api/credentials/{id} DELETE
/rest/api/vault/ GET POST
/rest/api/vault/{id} DELETE GET
/rest/api/services GET
/rest/api/services/{serviceName}/{eventName}/{parameterName}/list/ GET
/rest/api/services/{serviceName}/{eventName}/{parameterName}/typeahead/ GET
/rest/api/services/{serviceName}/{eventName}/{parameterName}/validate/ GET
/rest/api/events POST GET
/rest/api/events/{id} DELETE
/rest/api/trustee/validate GET POST
/rest/api/deactivation GET
```

In certain embodiments, the majority of the REST endpoints can require a header in order to complete. The value of the header can be a transient authentication token which can be returned as a result of successfully authenticating a user's account credentials via a call to an authorize endpoint. A token can be valid for a pre-specified time period (such as two hours). If a token is not used for a smaller pre-specified time period (such as thirty minutes), the token can expire sooner.

In certain embodiments, the system can further include one or more third-party libraries. In these embodiments, the one or more third-party libraries can include: (1) Apache HTTP-Client; (2) JSON; (3) Google Gdata; (4) HTML parser; (5) Java Mail; (6) Apache Commons Validation; (7) Guava; (8) JSR305; (9) Apache Commons Logging; (10) Apache Commons Code; (11) Apache HTTP-Core; (12) Apache Jersey Bundle; (13) ASM; (14) Jackson JAXB implementation; (15) MIME pull; (16) Apache Tomcat; (17) JQuery; or (18) JQuery UI.

Methods that can be implemented by a system (such as the system illustrated in FIG. 2) are now described. The steps of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in RAM, flash memory, ROM, EPROM, EEPROM, registers, hard disk, a removable disk, a CD-ROM, or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components.

Figure 3:
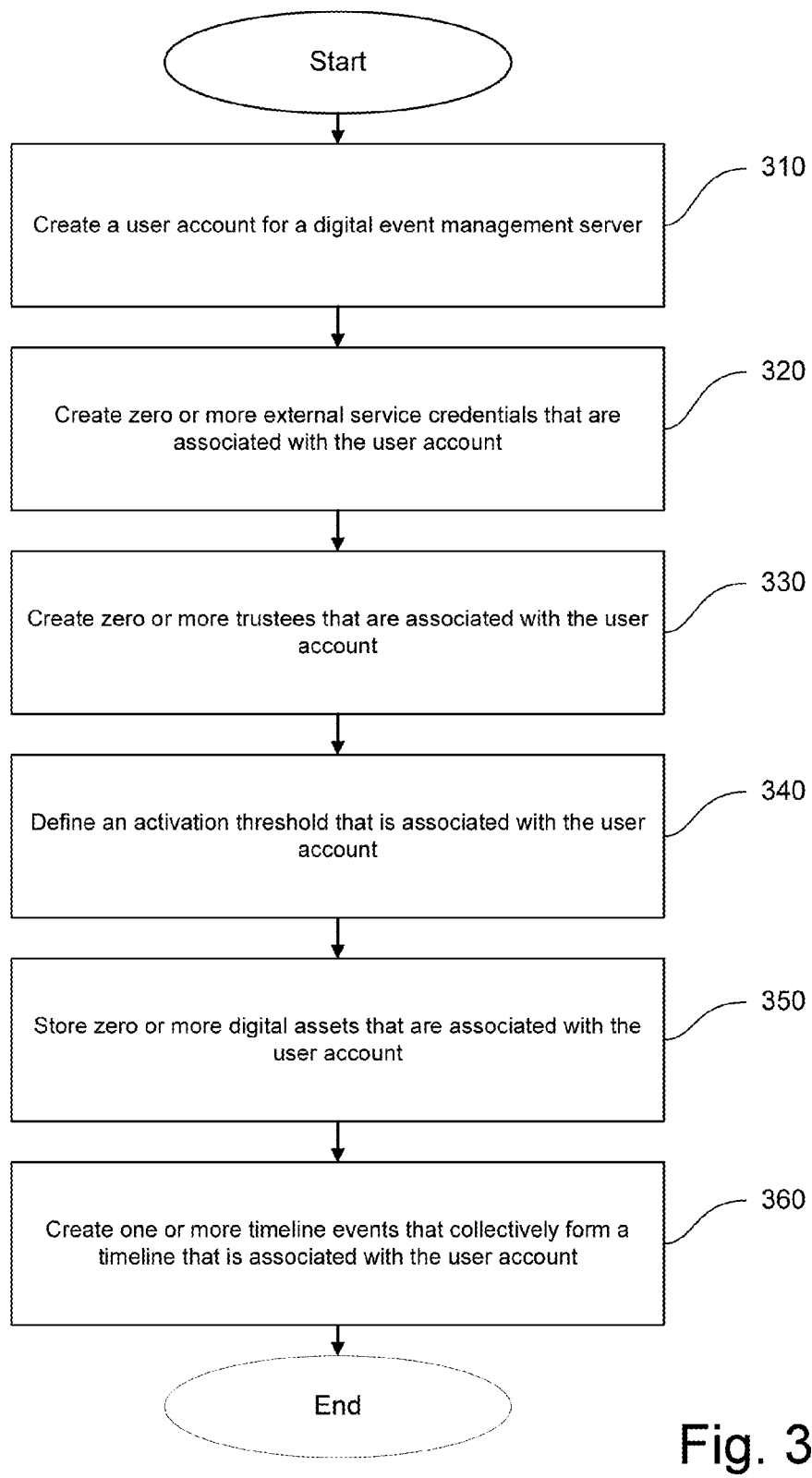
FIG. 3 illustrates a method for creating a timeline, according to an embodiment of the invention.

FIG. 3 illustrates a method for creating a timeline, according to an embodiment of the invention. The flow begins and proceeds to step 310. At step 310, a user account is created for a digital event management server. The user account can include one or more attributes of a user of the digital event management server. The one or more attributes can include a first name, a last name, an email address, or a password. The flow then proceeds to step 320.

At step 320, zero or more external service credentials that are associated with the user account are created. An external service credential can include one or more parameters used to connect to an external service. The one or more parameters can include a login or a password. An external service can be a service that is external to a system, and provided by an external system provider. Examples of an external service can include an external email service, an external social network service, or an external electronic commerce service. In certain embodiments, step 320 can be omitted. The flow then proceeds to step 330.

At step 330, zero or more trustees that are associated with the user account are created. A trustee can include one or more attributes of a trusted user that is associated with the user. The one or more attributes can include a first name, a last name, an email address, or an activation code. The trustee can further include one or more questions and answers. In certain embodiments, step 330 can be omitted. The flow then proceeds to step 340.

At step 340, an activation threshold that is associated with the user account is defined. The activation threshold can include a number of activation codes required to activate a timeline. In certain embodiments, step 340 can be omitted. The flow then proceeds to step 350.

At step 350, zero or more digital assets that are associated with the user account can be stored within the digital management server. A digital asset can include digital information stored in a digital format. In certain embodiments, step 350 can be omitted. The flow then proceeds to step 360.

At step 360, one or more timeline events are defined, where the one or more timeline events collectively form a timeline. A timeline event can include an action to be executed by a timeline server and a date the action is to be executed. In certain embodiments, the date can be a relative date. In other embodiments, the date can be an absolute date. Further, the timeline can include the one or more timeline events. The flow then ends.

Figure 4:
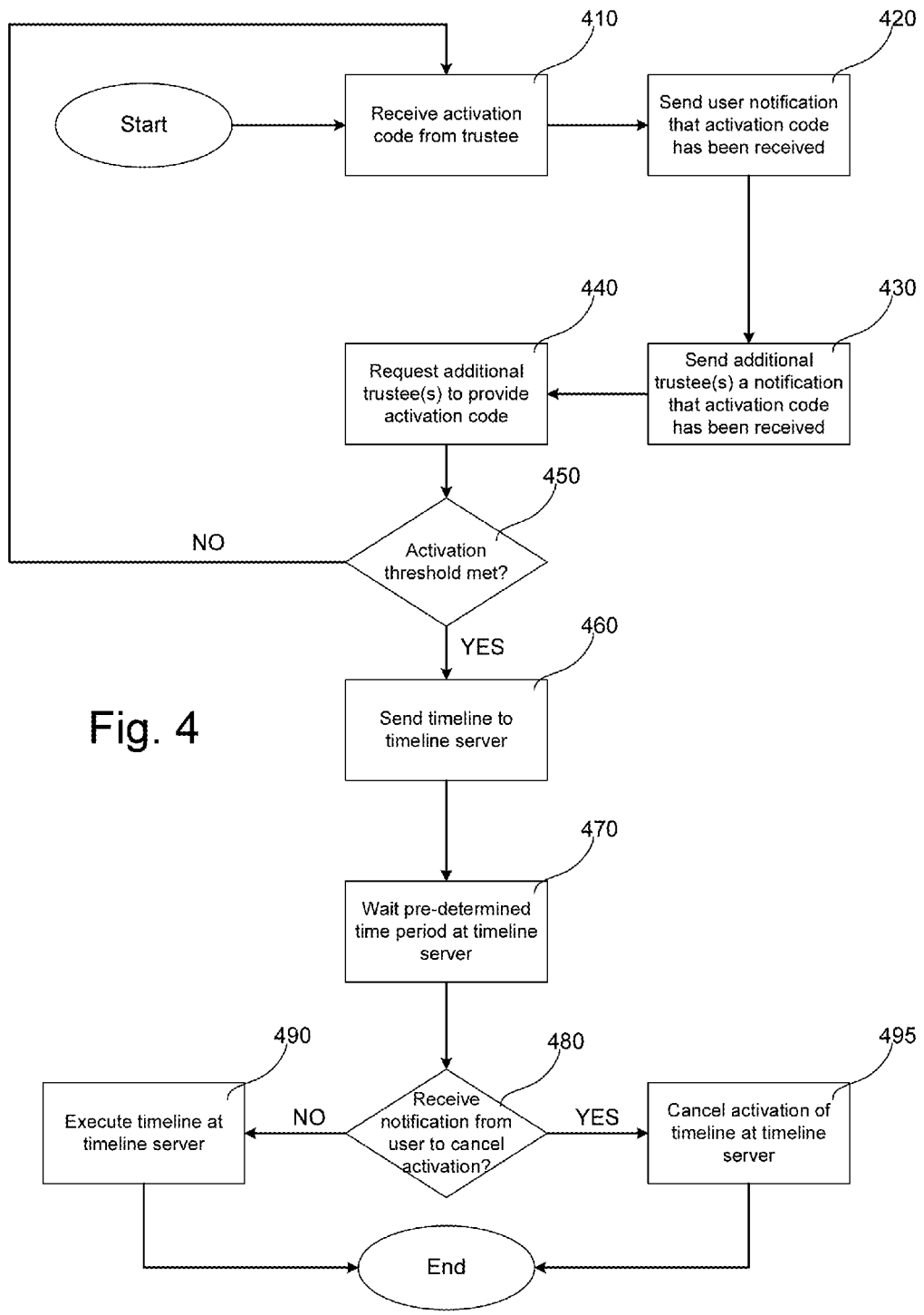
FIG. 4 illustrates a method for activating a timeline, according to an embodiment of the invention.

FIG. 4 illustrates a method for activating a timeline, according to an embodiment of the invention. The flow begins and proceeds to step 410. At step 410, an activation code for a timeline that is associated with a user account is received from a trustee that is associated with the user account. The flow then proceeds to step 420.

At step 420, a notification that the activation code has been received by the trustee is sent to a user associated with the user account. In certain embodiments, step 420 can be omitted. The flow then proceeds to step 430.

At step 430, a notification that the activation code has been received by the trustee is sent to at least one additional trustee associated with the user account. In certain embodiments, step 430 can be omitted. The flow then proceeds to step 440.

At step 440, at least one additional trustee associated with the user account is requested to provide an activation code. In certain embodiments, step 440 can be omitted. The flow then proceeds to step 450.

At step 450, it is determined whether an activation threshold associated with the user account has been met. The activation threshold can include a number of activation codes required to activate a timeline. Thus, it can be determined whether a number of activation codes that have been received by trustees associated with the account is less than, equal to, or greater than, the number of activation codes required to activate the timeline. If the activation threshold associated with the user account has not been met (i.e., the number of activation codes that have been received by trustees associated with the account is less than the number of activation codes required to activate the timeline), the flow returns to step 410. If the activation threshold associated with the user account has been met (i.e., the number of activation codes that have been received by trustees associated with the account is equal to, or greater than, the number of activation codes required to activate the timeline), the flow proceeds to 460.

At step 460, the timeline is sent to a timeline server. The timeline can be sent to the timeline server by a digital event management server. The timeline can include one or more timeline events. The flow proceeds to step 470.

At step 470, the timeline server waits a pre-determined time period. An example pre-determined time period can be twenty-four hours. In certain embodiments, step 470 can be omitted. The flow proceeds to step 480.

At step 480, the timeline server determines whether it has received a notification from the user associated with the user account to cancel activation of the timeline. If the timeline server has not received a notification from the user associated with the user account to cancel the activation of the timeline, the flow proceeds to step 490. If the timeline server has received a notification from the user associated with the user account to cancel the activation of the timeline, the flow proceeds to step 495.

At step 490, the timeline server executes the timeline. The execution of the timeline is further described in greater detail in relation to FIG. 5. The flow then ends.

At step 495, the timeline server cancels the activation of the timeline. The cancellation of the activation of the timeline can include stopping an execution of one or more timeline events of the timeline that are already executing, and cancelling an execution of one or more timeline events of the timeline that are currently pending. The flow then ends.

Figure 5:
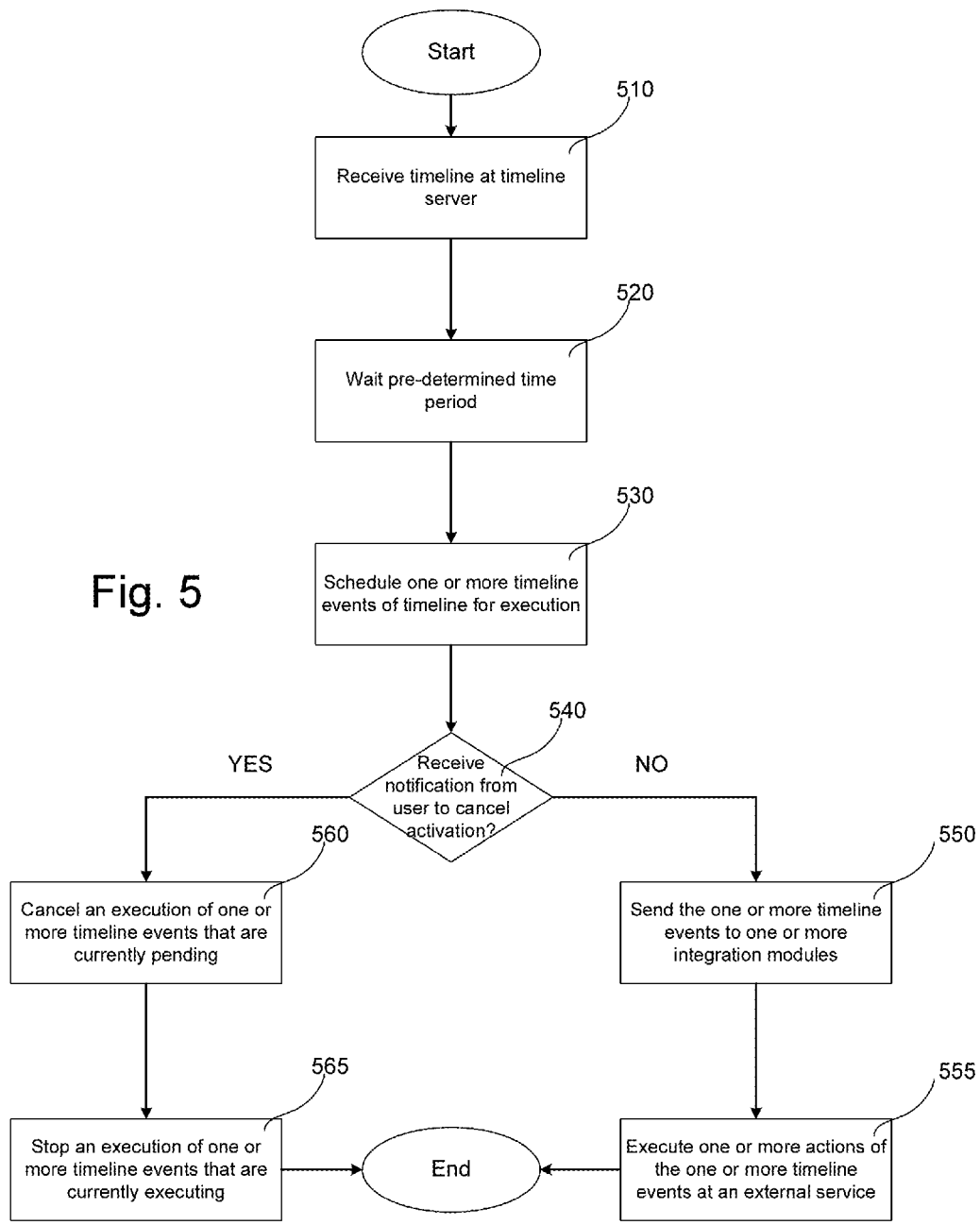
FIG. 5 illustrates a method for executing a timeline, according to an embodiment of the invention.

FIG. 5 illustrates a method for executing a timeline, according to an embodiment of the invention. The flow begins and proceeds to step 510. At step 510, a timeline is received by a timeline server. The timeline can be sent to the timeline server by a digital event management server. The timeline can include one or more timeline events. The flow proceeds to step 520.

At step 520, the timeline server waits a pre-determined time period. An example pre-determined time period can be twenty-four hours. In certain embodiments, step 520 can be omitted. The flow proceeds to step 530.

At step 530, the timeline server schedules the one or more timeline events of the timeline on one or more dates. For each timeline event of the one or more timeline events, the timeline server can identify a date associated with the timeline event, and can schedule the timeline event on the identified date. The flow proceeds to step 540.

At step 540, the timeline server determines whether it has received a notification from the user associated with the user account to cancel activation of the timeline. If the timeline server has not received a notification from the user associated with the user account to cancel the activation of the timeline, the flow proceeds to step 550. If the timeline server has received a notification from the user associated with the user account to cancel the activation of the timeline, the flow proceeds to step 560.

At step 550, the timeline server sends the one or more timeline events to one or more external service integration modules. The sending the one or more timeline events to the one or more external service integration modules can include calling a function of the at least one external service integration module using a service integration application programming interface. In an alternate embodiment, the timeline server can send the one or more timeline events to one or more third-party external service integration modules. In another alternate embodiment, the timeline server can send the one or more timeline events to one or more external device integration modules. In another alternate embodiment, step 550 can be omitted. The flow then proceeds to step 555.

At step 555, the timeline server executes the one or more actions of the one or more timeline events at an external service using at least one external service integration module and at least one external service credential associated with the user account. The executing of the one or more actions of the one or more timeline events at the external service can include performing one or more functions within the external service using the at least one external service integration module and the at least one external service credential. In an alternate embodiment, the timeline server executes the one or more actions of the one or more timeline events at the external service using at least one third-party external service integration module. In another alternate embodiment, the timeline server executes the one or more actions of the one or more timeline events at an external device using at least one external device integration module. In another alternate embodiment, the timeline server executes the one or more actions of the one or more timeline events at the timeline server. The flow then ends.

At step 560, the timeline server cancels an execution of one or more timeline events of the timeline that are currently pending. The flow then proceeds to step 565.

At step 565, the timeline server stops an execution of one or more timeline events of the timeline that are already executing. The flow then ends.

FIGS. 6-10 illustrate example user interfaces of a digital event management server, which each user interface can be displayed to a user at a screen of a computer or device. However, as one of ordinary skill in the art would readily appreciate, the user interfaces illustrated in FIGS. 6-10 are merely example user interfaces according to example embodiments of the invention. In alternate embodiments, a user interface that has a different appearance from the user interfaces illustrated in FIGS. 6-10 may be displayed.

Figure 6:
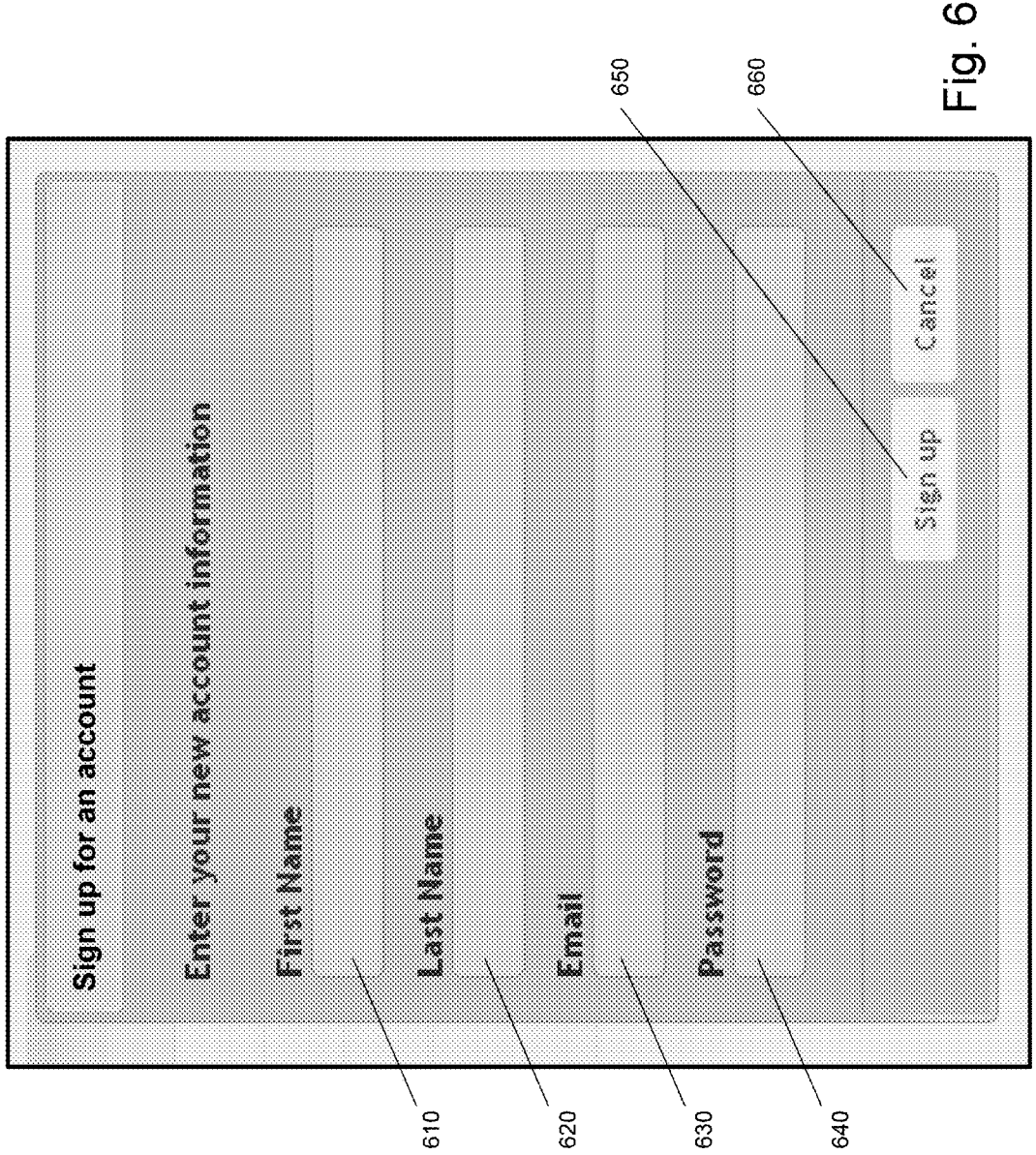
FIG. 6 illustrates a user interface of a digital event management server for creating a user account, according to an embodiment of the invention.

FIG. 6 illustrates a user interface of a digital event management server for creating a user account, according to an embodiment of the invention. The user interface can display first name attribute 610. A user can enter text within first name attribute 610, where the text is the first name of the user associated with the user account. The text can be subsequently stored by the digital event management server as the first name attribute of the user account. The user interface can further display last name attribute 620. A user can enter text within last name attribute 620, where the text is the last name of the user associated with the user account. The text can be subsequently stored by the digital event management server as the last name attribute of the user account. The user interface can further display email address attribute 630. A user can enter text within email address attribute 630, where the text is the email address of the user associated with the user account. The text can be subsequently stored by the digital event management server as the email address of the user account. The user interface can further display password attribute 640. A user can enter text within password attribute 640, where the text is the password of the user associated with the user account. The text can be subsequently stored by the digital event management server as the password of the user account. The user interface can also display sign-up button 650. By "clicking" on sign-up button 650, a user can cause the digital event management server to create a user account. Optionally, by "clicking" on sign-up button 650, a user can cause the digital event management server to validate the text entered within each of the aforementioned attributes, before the user account is created. The user interface can also display cancel button 660. By "clicking" on cancel button 660, a user can cause the digital event management server to cancel the creation of the user account.

Figure 7:
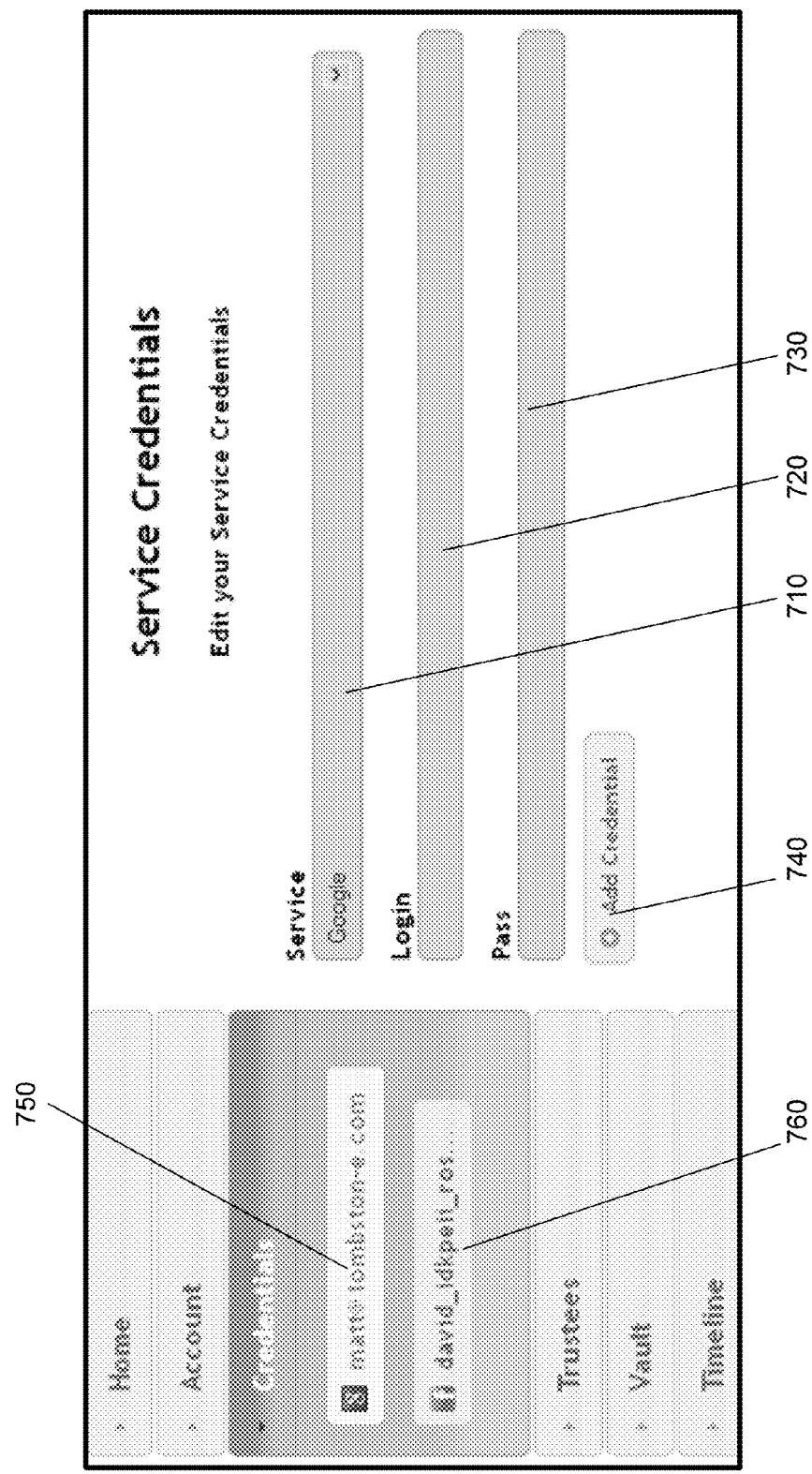
FIG. 7 illustrates a user interface of a digital event management server for creating an external service credential, according to an embodiment of the invention.

FIG. 7 illustrates a user interface of a digital event management server for creating an external service credential, according to an embodiment of the invention. The user interface can display an external service parameter 710. The user interface can display a list of one or more external services within external service type parameter 710. A user can select one of the external services from the list displayed within external service parameter 710. The selected external service can be subsequently stored by the digital event management server as the external service parameter of the external service credential. The user interface can further display a login parameter 720. A user can enter text within login parameter 720, where the text is the login of the external service credential. The text can subsequently be stored by the digital event management server as the login parameter of the external service credential. The user interface can further display a password parameter 730. A user can enter text within password parameter 730, where the text is the password of the external service credential. The text can subsequently be stored by the digital event management server as the password parameter of the external service credential. The user interface can also display add credential button 740. By "clicking" on add credential button 740, a user can cause the digital event management server to create an external service credential. Optionally, by "clicking" on add credential button 740, a user can cause the digital event management server to validate the selection made (or the text entered) within each of the aforementioned parameters, before the external service credential is created. The user interface can further display one or more external service credentials that have already been created. In the illustrated embodiment, the user interface displays external service credentials 750 and 760.

Figure 8:
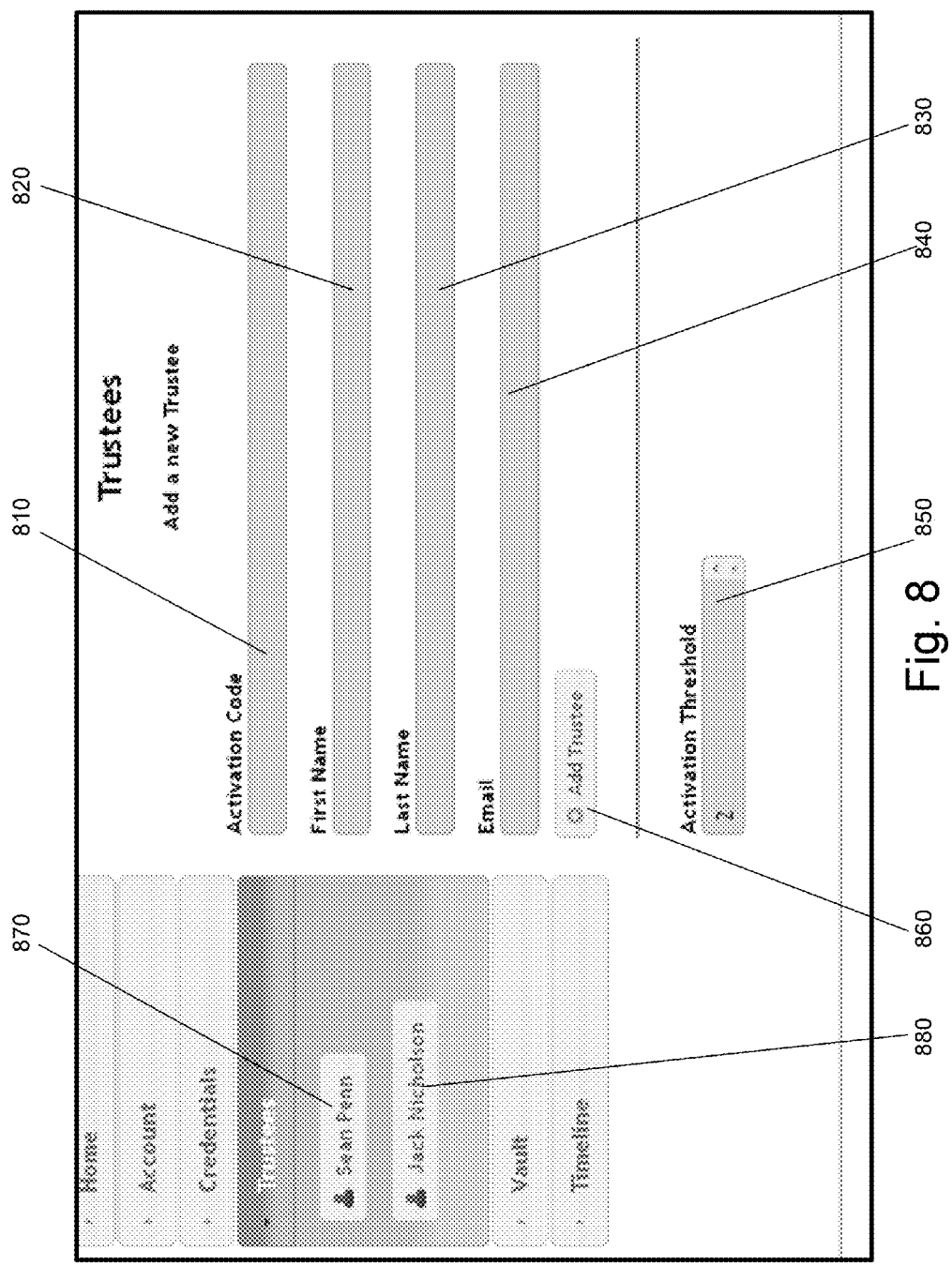
FIG. 8 illustrates a user interface of a digital event management server for creating a trustee and defining an activation threshold, according to an embodiment of the invention.

FIG. 8 illustrates a user interface of a digital event management server for creating a trustee and defining an activation threshold, according to an embodiment of the invention. The user interface can display an activation code 810, where an activation code verifies a trigger that is associated with a timeline of one or more timeline events, and where the trigger is used to activate and execute the timeline. A user can enter text within activation code 810, where the text is activation code associated with the trustee. The text can be subsequently stored by the digital event management server as the activation code of the trustee. In an alternate embodiment, the user interface does not display activation code 810, and a user does not enter the activation code associated with the trustee. Instead, in this embodiment, the digital management server generates the activation code associated with the trustee. The user interface can further display a first name attribute 820. A user can enter text within first name attribute 820, where the text is the first name of the trustee. The text can be subsequently stored by the digital event management server as the first name attribute of the trustee. The user interface can further display a last name attribute 830. A user can enter text within last name attribute 830, where the text is the last name of the trustee. The text can be subsequently stored by the digital event management server as the last name attribute of the trustee. The user interface can further display an email address attribute 840. A user can enter text within email address attribute 840, where the text is the email address of the trustee. The text can be subsequently stored by the digital event management server as the email address of the trustee. The user interface can also display an activation threshold 850, where an activation threshold is a number of activation codes required to be received from trustees in order to activate and execute a timeline. The user interface can display a list of one or more activation thresholds within activation threshold 850. A user can select one of the activation thresholds from the list displayed within activation threshold 850. The selected activation threshold can be subsequently stored by the digital event management server as the activation threshold of the user account. The user interface can also display add trustee button 860. By "clicking" on add trustee button 860, a user can cause the digital event management server to create a trustee and define an activation threshold. Optionally, by "clicking" on add trustee button 860, a user can cause the digital event management server to validate the selection made (or the text entered) within each of the aforementioned attributes, before the trustee is created and the activation threshold is defined. The user interface can further display one or more trustees that have already been created. In the illustrated embodiment, the user interface displays trustees 870 and 880.

Figure 9:
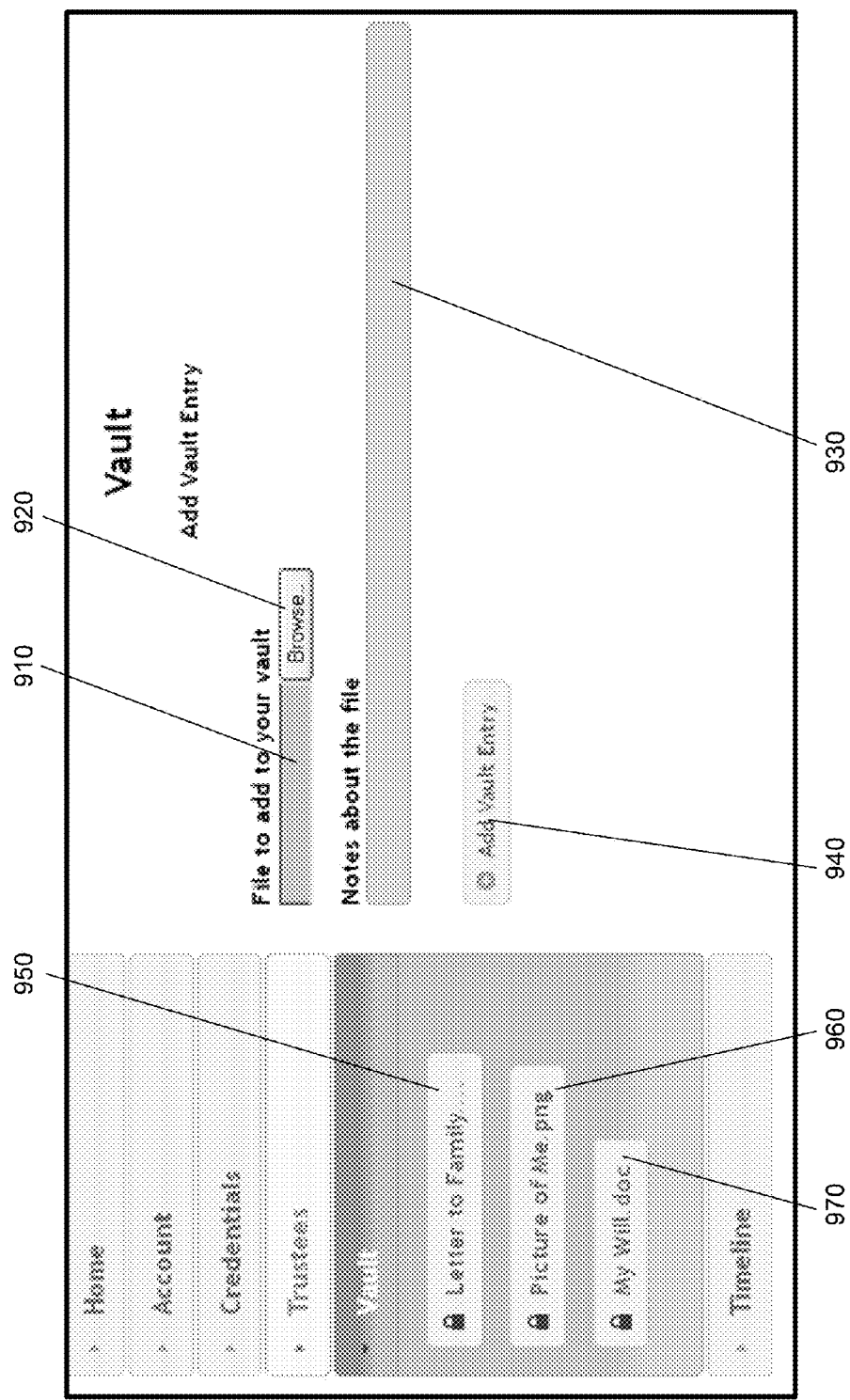
FIG. 9 illustrates a user interface of a digital event management server for storing a digital asset, according to an embodiment of the invention.

FIG. 9 illustrates a user interface of a digital event management server for storing a digital asset, according to an embodiment of the invention. The user interface can display a digital asset file path 910, where a digital asset is any digital information, such as an item of text or media (e.g., a document, an image, or a video) stored within a digital format (e.g., a computer file). A user can enter text within digital asset file path 910, where the text is the file path for the digital asset stored on the user's local computer or device. Alternatively, the text can automatically be entered within digital assert file path 910, in response to the user "clicking" on browse button 920, and navigating to the file path for the digital asset using the subsequent user interface that is displayed to the user, where the subsequent user interface displays the file directory for the user's local computer or device. The user interface can further display a note attribute 930. The text can be subsequently stored by the digital event management server as the note attribute of the digital asset. The user interface can also display add digital asset button 940. By "clicking" on add digital asset button 940, a user can cause the digital event management server to store the digital asset within a digital asset storage. Optionally, by "clicking" on add digital asset button 940, a user can cause the digital event management server to validate the selection made (or the text entered) within each of the aforementioned attributes, before the digital asset is stored within the digital asset storage. The user interface can further display one or more digital assets that have already been stored. In the illustrated embodiment, the user interface displays digital assets 950, 960, and 970.

Figure 10:
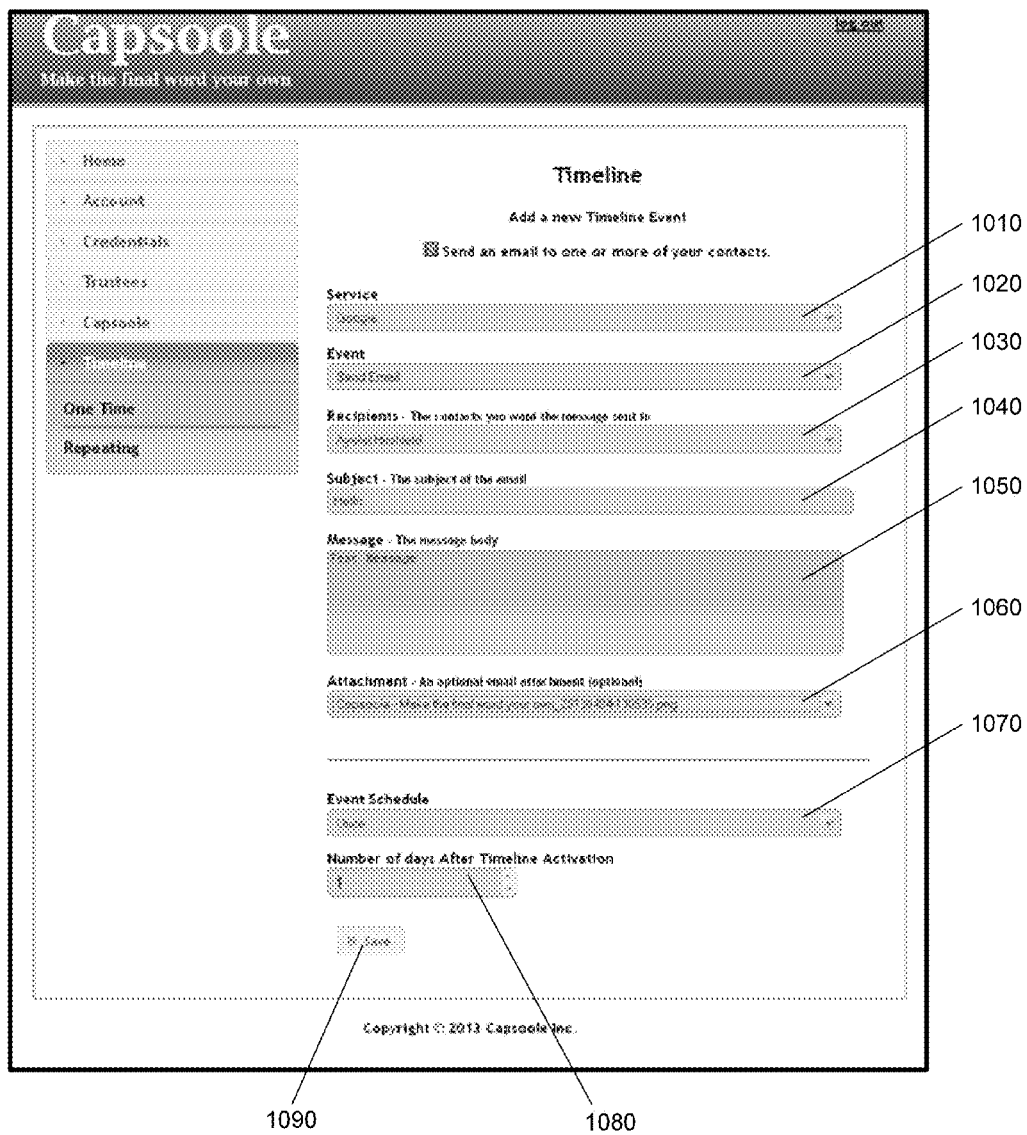
FIG. 10 illustrates a user interface of a digital event management server for creating a timeline event, according to an embodiment of the invention.

FIG. 10 illustrates a user interface of a digital event management server for creating a timeline event, according to an embodiment of the invention. The user interface can display external service 1010. The user interface can display a list of one or more external services within external service 1010. A user can select one of the external services from the list displayed within external service 1010. The selected external service can be subsequently stored by the digital event management server as the external service for the timeline event. The user interface can further display timeline event type 1020. The user interface can display a list of one or more timeline event types within timeline event type 1020. A user can select one of the timeline event types from the list displayed within timeline event type 1020. The user interface can further display one or more timeline event attributes, depending on the selected timeline event type. In the illustrated embodiment, because the user has selected the timeline event type "Send Email," the user interface displays email recipient attribute 1030, email subject attribute 1040 email message attribute 1050, and email attachment attribute 1060. However, in alternate embodiments, the user interface can display other attributes that are appropriate for the timeline event type. The user can either enter text or select an entry within each displayed timeline event attribute. The user interface can also display timeline event schedule 1070. The user interface can display a list of schedule types within timeline event schedule 1070, where example schedule types include "Once" (which indicates that the timeline event is scheduled for a single occurrence) and "Repeating" (which indicates that the timeline event is scheduled for repeated occurrences). A user can select one of the schedule types from the list displayed within timeline event schedule 1070. The selected schedule type can be subsequently stored by the digital event management server as the schedule type for the timeline event. The user interface can further display timeline event schedule date 1080. According to the illustrated embodiment, the user interface can display a list of one or more days after an activation of a timeline within timeline event schedule date 1080. A user can select one of the days from the list displayed within timeline event schedule date 1080. In an alternate embodiment, a user can enter text within timeline event schedule date 1080, where the text is the schedule date of the timeline event. In another alternate embodiment, the user interface can display a calendar within timeline event schedule date 1080. A user can select a date from the calendar displayed within timeline event schedule date 1080. The user interface can also display save timeline event button 1090. By "clicking" on save timeline event button 1090, a user can cause the digital event management server to create a timeline event. Optionally, by "clicking" on save timeline event button 1090, a user can cause the digital event management server to validate the selection made (or the text entered) within each of the aforementioned attributes, before the timeline event is created.

Thus, according to an embodiment, a method and a system can be provided that can manage digital events. The method and system can provide the user with flexibility in managing digital assets and external service credentials among a plurality of external services. The method and system can further allow the user to create a plan for actions to be executed even after the individual has either died or become incapacitated. Thus, the user is given the capability of managing his or her digital assets and online personas across a plurality of external services.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:

creating a user account for a digital event management server, wherein the user account comprises one or more attributes of a user of the digital event management server;

creating one or more external service credentials that are associated with the user account, wherein an external service credential comprises one or more parameters used to connect to an external service;

creating one or more timeline events that collectively form a timeline that is associated with the user account, wherein a timeline event comprises an action to be executed by a timeline server and a date the action is to be executed, and wherein the timeline comprises the one or more timeline events;

creating one or more trustees that are associated with the user account, wherein a trustee comprises one or more attributes of a trusted user associated with the user, and wherein at least one attribute of the one or more attributes comprises an activation code;

defining an activation threshold for the timeline, wherein the activation threshold comprises a number of activation codes required to activate a timeline;

receiving the activation code for the timeline from a trustee of the one or more trustees;
determining if the activation threshold has been met; and
activating the timeline when the activation threshold has been met.

2. The method of claim 1, further comprising:
storing one or more digital assets that are associated with the user account within the digital event management server, wherein a digital asset comprises digital information stored in a digital format.

3. The method of claim 1, further comprising:
activating the timeline.

4. The method of claim 3, further comprising:
executing the timeline.

5. The method of claim 4, further comprising:
waiting a pre-defined time period before executing the timeline.

6. The method of claim 4, the executing the timeline further comprising:
scheduling the one or more timeline events for execution on one or more dates;
executing the one or more actions of the one or more timeline events.

7. The method of claim 4, further comprising:
receiving a notification to cancel the activation of the timeline;
stopping an execution of one or more timeline events of the timeline that are already executing; and
cancelling an execution of one or more timeline events of the timeline that are currently pending.

8. The method of claim 6, wherein the executing the one or more actions of the one or more timeline events further comprises:
sending the one or more timeline events to one or more external service integration modules; and
executing the one or more actions of the one or more timeline events at an external service using at least one external service integration module of the one or more external service integration modules and at least one external service credential of the one or more external service credentials.

9. The method of claim 8, wherein the sending the one or more timeline events to one or more external service integration modules further comprises calling a function of the at least one external service integration module using a service integration application programming interface.

10. The method of claim 8, wherein the executing the one or more actions of the one or more timeline events at the external service further comprises performing one or more functions within the external service using the at least one external service integration module and the at least one external service credential.

11. The method of claim 6, wherein the executing the one or more actions of the one or more timeline events further comprises:
sending the one or more timeline events to one or more third-party external service integration modules; and
executing the one or more actions of the one or more timeline events at an external service using at least one third-party external service integration module of the one or more third-party external service integration modules and at least one external service credential of the one or more external service credentials.

12. The method of claim 6, wherein the executing the one or more actions of the one or more timeline events further comprises:
sending the one or more timeline events to one or more external device integration modules; and
executing the one or more actions of the one or more timeline events at an external device using at least one external device integration module of the one or more external device integration modules.

13. The method of claim 6, wherein the executing the one or more actions of the one or more timeline events further comprises executing the one or more actions of the one or more timeline events at a timeline server.

14. The method of claim 1, wherein the activating the timeline further comprises sending the timeline to a timeline server,
wherein the timeline server is configured to execute the timeline.

15. The method of claim 1, further comprising:
sending a user a notification that the activation code has been received from the trustee;
sending at least one additional trustee a notification that the activation code has been received from the trustee; and
requesting the at least one additional trustee to provide an activation code.

16. The method of claim 15, further comprising:
receiving a notification to cancel activation of the timeline; and
canceling the activation of the timeline.

17. The method of claim 16, wherein the cancelling the activation of the timeline further comprises:
stopping an execution of one or more timeline events of the timeline that are already executing; and
cancelling an execution of one or more timeline events of the timeline that are currently pending.

18. The method of claim 1, wherein the date comprises one of: a relative date or an absolute date.

19. An apparatus, comprising:
a processor configured to execute one or more modules;
a memory configured to store one or more modules;
a user account creation module configured to create a user account for a digital event management server, wherein the user account comprises one or more attributes of a user of the digital event management server;
an external service credential creation module configured to create one or more external service credentials that are associated with the user account, wherein an external service credential comprises one or more parameters used to connect to an external service;
a timeline event creation module configured to create one or more timeline events that collectively form a timeline that is associated with the user account, wherein a timeline event comprises an action to be executed by a timeline server and a date the action is to be executed, and wherein the timeline comprises the one or more timeline events;
a trustee creation module configured to create one or more trustees that are associated with the user account, wherein a trustee comprises one or more attributes of a trusted user associated with the user, and wherein at least one attribute of the one or more attributes comprises an activation code;
an activation threshold definition module configured to define an activation threshold for the timeline, wherein the activation threshold comprises a number of activation codes required to activate a timeline;
an activation code reception module configured to receive an activation code for the timeline from a trustee of the one or more trustees;

an activation determination module configured to determine if the activation threshold has been met; and a timeline activation module configured to activate the timeline when the activation threshold has been met.

20. The apparatus of claim 19, further comprising:

a digital asset storage module configured to store one or more digital assets that are associated with the user account within the digital event management server, wherein a digital asset comprises digital information stored in a digital format.

21. The apparatus of claim 19, further comprising:

a timeline event schedule module configured to schedule the one or more timeline events for execution on one or more dates;

a timeline event transmission module configured to send the one or more timeline events to one or more external service integration modules; and a timeline event execution module configured to execute the one or more actions of the one or more timeline events at an external service using at least one external service integration module of the one or more external service integration modules and at least one external service credential of the one or more external service credentials.

22. A non-transitory computer-readable medium having a computer program stored thereon that, when executed by a processor, causes the processor to implement a method, the method comprising:

creating a user account for a digital event management server, wherein the user account comprises one or more attributes of a user of the digital event management server;

creating one or more external service credentials that are associated with the user account, wherein an external service credential comprises one or more parameters used to connect to an external service;

creating one or more timeline events that collectively form a timeline that is associated with the user account, wherein a timeline event comprises an action to be executed by a timeline server and a date the action is to be executed, and wherein the timeline comprises the one or more timeline events;

creating one or more trustees that are associated with the user account, wherein a trustee comprises one or more attributes of a trusted user associated with the user, and wherein at least one attribute of the one or more attributes comprises an activation code;

defining an activation threshold for the timeline, wherein the activation threshold comprises a number of activation codes required to activate a timeline;

receiving the activation code for the timeline from a trustee of the one or more trustees;

determining if the activation threshold has been met; and activating the timeline when the activation threshold has been met.

23. The non-transitory computer-readable medium of claim 22, the method further comprising:

storing one or more digital assets that are associated with the user account within the digital event management server, wherein a digital asset comprises digital information stored in a digital format.

24. The non-transitory computer-readable medium of claim 22, the method further comprising:

scheduling the one or more timeline events for execution on one or more dates;

sending the one or more timeline events to one or more external service integration modules; and executing the one or more actions of the one or more timeline events at an external service using at least one external service integration module of the one or more external service integration modules and at least one external service credential of the one or more external service credentials.

25. An apparatus, comprising:

means for creating a user account for a digital event management server, wherein the user account comprises one or more attributes of a user of the digital event management server;

means for creating one or more external service credentials that are associated with the user account, wherein an external service credential comprises one or more parameters used to connect to an external service;

means for creating one or more timeline events that collectively form a timeline that is associated with the user account, wherein a timeline event comprises an action to be executed by a timeline server and a date the action is to be executed, and wherein the timeline comprises the one or more timeline events;

means for creating one or more trustees that are associated with the user account, wherein a trustee comprises one or more attributes of a trusted user associated with the user, and wherein at least one attribute of the one or more attributes comprises an activation code;

means for defining an activation threshold for the timeline, wherein the activation threshold comprises a number of activation codes required to activate a timeline;

means for receiving the activation code for the timeline from a trustee of the one or more trustees;

means for determining if the activation threshold has been met; and means for activating the timeline when the activation threshold has been met.

* * * * *